JOHN G. FOSTER.
Improvement in Electro-Magnetic Apparatus for Steering Torpedo Boats, Etc.
No. 125,039. Patented March 26, 1872.
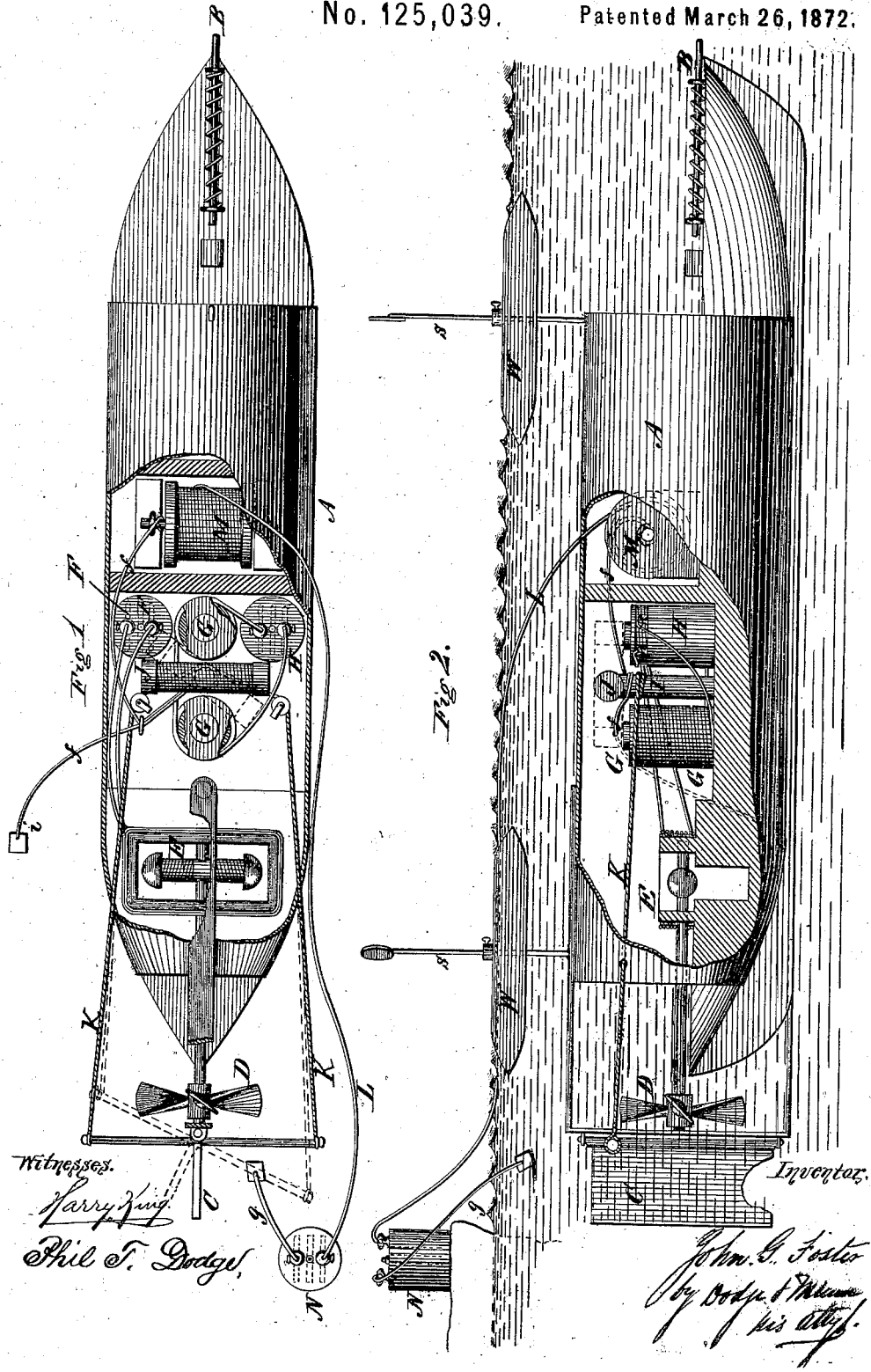

UNITED STATES PATENT OFFICE.

JOHN G. FOSTER, OF NASHUA, NEW HAMPSHIRE.

IMPROVEMENT IN ELECTRO-MAGNETIC APPARATUS FOR STEERING TORPEDO-BOATS, &c.

Specification forming part of Letters Patent No. 125,039, dated March 26, 1872.

SPECIFICATION.

*To all whom it may concern:*

Be it known that I, JOHN G. FOSTER, of Nashua, in the county of Hillsborough and State of New Hampshire, have invented certain Improvements in Torpedo-Boats, of which the following is a specification, reference being had to the accompanying drawing.

My invention relates to a torpedo or torpedo-boat provided with propelling devices, to be directed against vessels from a distance; and consists in a novel arrangement of electrical steering devices by which the operator on shore or on a vessel can guide and direct it as it proceeds from him.

Figure 1 is a top-plan view of my torpedo, and Fig. 2 a side elevation of the same, portions being broken away in both views to expose the interior parts.

In proceeding to construct my torpedo I provide a hollow boat or body, A, of any suitable size, and of such form as may be found best in practice. In the forward end of the body I place the explosive material or torpedo proper, and a sliding rod, B, or other suitable device, so arranged that when the torpedo strikes the enemy's vessel the rod will be forced back so as to explode the charge. To the rear end of the body I attach a rudder, C, for steering or guiding it, and a screw-propeller, D, for forcing it forward. The propeller-shaft I drive by means of an ordinary electro-magnetic engine, E, operated by a battery, F, or by any other suitable means, which can be placed in a small space, and that will operate for a considerable time without requiring attention. In the body I mount an upright U-shaped electro-magnet G, and keep the same in constant operation by means of a battery, H, placed by its side. Between the two arms of the magnet G I mount an upright shaft or drum, I, having a horizontal electro-magnet, J, secured to its upper end, so that it can turn around above the arms of the magnet G, and thus rotate the drum. Around the drum I, I wind a chain, K, or flexible wire, and pass the ends of the same back and attach them to opposite ends of the rudder-head or yoke, as shown, so that the rotation of the magnet J and its drum serves to operate the rudder and guide the course of the boat. One end, $i$, of the wire or helix of the magnet J, I pass out into the water, as shown, and the opposite end I connect, by a wire, $f$, in any suitable manner, with the inner end of a coil of insulated wire, L which is wound upon a drum, M, placed in the body, as shown. The outer end of the wire L, I pass through the upper side of the body and connect it with one pole of a battery, N, which is placed on shore, or on a vessel from which the torpedo is to be sent, the opposite pole of the battery being provided with a wire, $g$, leading into the water, as shown. Thus, it will be seen that one connection is made from the battery N to the magnet J, through the wires L and $f$, and that the other connection is made through the water and the wires $g$ and $i$ dipping therein.

As the torpedo moves forward the wire uncoils from the drum M and rests in or on the water, and thus maintains the connection between the stationary battery and the magnet in the torpedo which is moving away from the battery. When the rudder stands straight astern, the magnet J stands in the position shown in Fig. 1; but as soon as the connections with the battery N are made the magnet assumes its polarity and its two poles are attracted by the opposite poles of the magnet G, which causes it to turn with its shaft or drum, and thereby swing the rudder to one side. But if, now, the battery-wires are interchanged, so as to reverse the course of the current through the magnet J, its polarity will be reversed so that the magnet G will draw it around in the opposite direction, so as to swing the rudder to the opposite side. By this arrangement of parts, therefore, the operator on shore can, by simply shifting the battery connections so as to reverse the current, turn the rudder to the right or left at will, no matter at what distance the boat may be from him, or under what speed it may be traveling.

It is obvious that the details of the arrangement may be varied in many respects without departing from the principle of operation, and that any suitable arrangement may be used for reversing the current quickly. The torpedo may be arranged to travel upon the water, or below the surface of the same, as shown. In the latter case it will be supported by small floats or buoys W, traveling on the surface. These floats may be connected to the torpedo by rods $s$, which may be arranged to slide through the floats, and to be fastened by thumb-screws, so that the torpedo can be sunk to any desired depth and then held by turning up the thumb-screws. By thus making the rods adjustable, so as to regulate the depth of the torpedo, it may be caused to strike the vessel at any required distance below the water-line that may be necessary.

To the upper ends of the rods $s$ of the floats, or to rods attached for the special purpose, I attach suitable sights by which the operator can determine the position of his boat and see how to properly guide it. The sights should be of a brilliant color on the side toward the operator, so as to be readily seen by him, but of a gray or dark color on the side towards the enemy, so as not to attract their attention. When the torpedo is to be used at night, lights may be used as sights, but in such case they should be concealed from the enemy by reflectors or shields.

In order that the operator may the more readily distinguish between the front and rear sights at a distance, they should be made of different colors or shapes. The chamber containing the propelling and steering devices must, of course, be made water-tight, so as to exclude the water, which would interfere with the operation of the batteries and the proper control of the currents. In order to accomplish this, rods may be used for operating the rudder and arranged to work through stuffing-boxes in the body. The wire L may be simply insulated with a water-proof coating and allowed to sink into the water as it uncoils; or it may be covered with any buoyant substance or material which will support it on the surface of the water. When the torpedo is to be used under water it should be so constructed that it will have almost enough buoyancy to float, so that very small floats may be used on the surface. The floats, like the back of the sights, should be colored in such manner as not to attract attention. If preferred, two steering-wires may be used, instead of completing the circuit by means of the water, and these two insulated wires may be secured together and wound upon one drum, or left separate and wound upon different drums. The principal advantage of using two separate wires is that, in case either of them should break, the water, forming a connection between the broken ends, will complete the circuit, and enable the parts to operate as well as before; while, if a single wire is used, and it is broken, the circuit is broken, and the torpedo left beyond the control of the operator. If found necessary, the two wires leading into the water may be provided with metal plates on their ends, so as to have a large contact surface; or, instead, the one on the torpedo may be attached to the body or other portion of the torpedo which may be in contact with the water; but, in such case the other parts of the electrical devices must of course be insulated therefrom. Instead of using the electro-magnet G, a strong permanent magnet may be used.

I am aware that electricity has been used to let steam on and off a steam-engine, which operated the steering devices of a torpedo-boat; this I do not claim; but, having herein described my invention, what I do claim is—

1. The herein-described method of operating the steering devices of a torpedo-boat by means of the direct application of electricity to the same, as set forth.

2. In combination with an electro-magnetic apparatus for steering torpedo-boats, the reel or drum M, constructed and arranged for operation, substantially as and for the purpose set forth.

3. The combination of the batteries N and H with the magnet J, drum I, and rudder C, constructed and arranged to operate substantially as and for the purpose set forth.

JOHN G. FOSTER.

Witnesses:
J. McKENNEY,
PHIL. T. DODGE.